United States Patent [19]

Allemand et al.

[11] Patent Number: 5,729,379
[45] Date of Patent: Mar. 17, 1998

[54] ELECTROCHROMIC DEVICES

[75] Inventors: Pierre-Marc Allemand; F. Randall Grimes; Anoop Agrawal; Barbara A. Bigelow; Andrew R. Ingle, all of Tucson, Ariz.

[73] Assignee: Donnelly Corporation, Holland, Mich.

[21] Appl. No.: 547,578

[22] Filed: Oct. 24, 1995

Related U.S. Application Data

[63] Continuation-in-part of Ser. No. 329,502, Oct. 26, 1994, abandoned.

[51] Int. Cl.$^6$ ............................................. G02F 1/153
[52] U.S. Cl. ........................... 359/270; 359/273; 359/275
[58] Field of Search ............................. 359/265, 270, 359/272, 273, 268, 275

[56] References Cited

U.S. PATENT DOCUMENTS

| | | | |
|---|---|---|---|
| 4,304,465 | 12/1981 | Diaz | 350/357 |
| 4,586,792 | 5/1986 | Yang et al. | 350/357 |
| 4,671,619 | 6/1987 | Kamimori et al. | 350/357 |
| 4,728,177 | 3/1988 | Green | 350/357 |
| 4,749,260 | 6/1988 | Yang et al. | 350/357 |
| 4,750,816 | 6/1988 | Ito et al. | 350/357 |
| 4,842,383 | 6/1989 | Yang | 350/357 |
| 4,960,324 | 10/1990 | Brown | 350/357 |
| 5,042,923 | 8/1991 | Wolf et al. | 359/275 |
| 5,066,112 | 11/1991 | Lynam et al. | 359/267 |
| 5,073,012 | 12/1991 | Lynam | 359/265 |
| 5,140,455 | 8/1992 | Varaprasad et al. | 359/236 |
| 5,189,549 | 2/1993 | Leventis et al. | 359/271 |
| 5,209,871 | 5/1993 | Mason | 252/500 |
| 5,215,684 | 6/1993 | Okabayashi et al. | 359/265 |
| 5,215,821 | 6/1993 | Ho | 428/432 |
| 5,239,405 | 8/1993 | Varaprasad et al. | 359/272 |
| 5,239,406 | 8/1993 | Lynam | 359/275 |

OTHER PUBLICATIONS

A.F. Diaz, et al. J. Electroanal. Chem., 111, 115 (1980).
T. Kobayashi, et al., J. Electroanal. Chem., 161, 419 (1984).
T. Meisel, et al., Proc. SPIE, vol. 1728, 200–210 (1992).
Y. Cao, et al., Polymers, 30, 2305 (1989).
M. Angelopoulos, et al., Mol. Cryst. Lig. Cryst., 160, 151–153 (1988).
A.G. Green, et al., J. Chem. Soc., 97, 2388 (1910).
I. Harada, et al., Synth. Met., 29, E303 (1989).
N. Oyama, et al., J. Macromol, Sci. Chem., A26, 593 (1989).
A. Factor, et al., Polymer Letters, 9, 289 (1971).
Y. Cao, et al., Synth. Met., 48, 91 (1992).

*Primary Examiner*—David C. Nelms
*Assistant Examiner*—Dawn-Marie Bey
*Attorney, Agent, or Firm*—Fitzpatrick, Cella, Harper Scinto

[57] ABSTRACT

An electrochromic device is disclosed having a conducting electrode opposing a counter conducting electrode with an electrochemically active polymeric layer disposed on an opposing surface of one of said electrodes and an electrolyte containing at least one redox active material contactingly disposed between the electrochemically active layer and an other opposing surface of one of said electrodes, wherein at least one of the electrodes is transparent. Also disclosed is an electrochromic device that exhibits low light transmission or reflectivity with no applied potential or after removal of an applied potential.

43 Claims, 3 Drawing Sheets

ELECTROCHROMIC DEVICES

RELATED APPLICATIONS

This is a continuation-in-part of U.S. patent application Ser. No. 08/329,502, filed Oct. 26, 1994, now abandoned.

BACKGROUND OF THE INVENTION

1. Field of the Invention

This invention is directed to an electrochromic device, such as a rearview mirror or glazing, having two opposed conducting electrodes, at least one of which is transparent, with an electrochemically active polymeric layer disposed on an opposing surface of one of said conducting electrodes and an electrolyte containing at least one redox active material disposed between and in contacting relationship with the electrochemically active layer and an other opposing surface of one of said electrodes. In addition, the outer surface of each transparent conducting electrode can have a substrate disposed thereon, at least one of which is transparent. Another aspect of this invention is directed to an electrochromic device that exhibits low light transmission or reflectivity with no applied potential or after an applied potential is removed.

2. Related Prior Art

Electrochromic (EC) devices are useful for making antiglare automotive mirrors, displays, windows and filters for a variable reflection or transmission of electromagnetic radiation. A number of EC devices have been suggested that are based on electrochemically active polymeric materials which are conducting and/or redox polymeric materials such as polyaniline, polypyrrole, polythiophene, polyimides, polyviologens, their derivatives, or composite materials, copolymers and blends that have at least one phase that is based on such polymers.

U.S. Pat. No. 4,750,816 discloses an electrochromic element having a pair of electrodes, at least one of which is transparent, wherein each electrode is coated with an electrochemically active material on the opposing surfaces of the electrodes and a liquid or solid electrolyte is disposed between the coated electrodes. At least one of the coatings of electrochemically active material in this reference is composed of conducting and/or redox polymeric materials as described above. Similar devices are disclosed in U.S. Pat. No. 4,960,324, U.S. Pat. No. 5,189,549, U.S. Pat. No. 5,209,871 and U.S. Pat. No. 5,215,821. All these references disclose the use of two electrodes, each of which, are coated with an electrochemically active material.

Other EC devices have been suggested wherein only one electrode is coated with an electrochemically active material, such as the polymeric materials described above. U.S. Pat. No. 4,304,465, U.S. Pat. No. 4,586,792 and U.S. Pat. No. 4,749,260 are directed to transmissive panels having this type of construction. These references disclose electrolytes which consist of salts in organic solvents or acidic aqueous solutions. None of these references, disclose or suggest the use of an electrolyte with a redox material in the absence of a second electrode coated with an electrochemically active material.

U.S. Pat. No. 4,671,619 discloses an electrical optical device having an electrochromic material layer and an electrolytic solution interposed between mutually opposed base plates, each having an electrode disposed on the surface thereof, wherein the electrolytic solution consists of a redox reaction promoter and a lactone solvent for dissolving the redox promoter. The reference discloses that exemplary electrochromic materials include $WO_3$, $MoO_3$, $TiO_2$, and $Ir_2O_3$. This reference does not disclose the use of electrochemically active polymeric material.

An object of this invention is to provide an improved electrochromic device, particularly for rearview mirrors and glazing of significant surface area, such as those exceeding 100 cm$^2$.

Another object of this invention is to provide an electrochromic device having a low light transmission or reflectivity when no potential is applied or after an applied potential is removed.

SUMMARY OF THE INVENTION

This invention is directed to an electrochromic device comprising a conducting electrode opposing a counter conducting electrode with an electrochemically active polymeric layer disposed on an opposing surface of one of said electrodes and an electrolyte containing at least one redox active material contactingly disposed between said electrochemically active polymeric material layer and an other opposing surface of one of said electrodes. At least one of the electrodes is transparent. The invention further relates to an electrochromic device described above having a first substrate disposed on a nonopposing surface of said conducting electrode and a second substrate disposed on a nonopposing surface of said counter conducting electrode, wherein at least one of the substrates disposed on the electrodes is transparent.

The electrochemically active polymers of this invention typically possess electrochromic properties and are typically electronic conductors or semiconductors. A wide range of electrochemically active polymers is known to those skilled in the art. Exemplary electrochemically active polymers useful in the instant invention include, without limitation, polyphenylene vinylenes, polythienylene vinylenes, polyalkoxythienylene vinylenes, polyfurylene vinylenes, polythiophenes, polyisothianaphthenes, polyanilines, polyarylamines, polyindoles, polypyrroles, polyalkoxyphenylenes, polyphenylenes, polyperinaphthalenes, polynaphthylamines, polyvinylmetalocenes, carbon cluster (fullerenes) and carbon cluster containing polymers, polyimides, polyviologens. Other electrochemically active polymeric materials which may be employed in the present invention include, without limitation, derivatives of the aforementioned polymers, such as those prepared by sulfonation or substitution, copolymers, blends and composites, where the matrix may be organic or inorganic but at least one of the components is from the polymers or their derivatives described above. Some typical examples of these composites and blends are polyaniline or polypyrrole with prussian blue, polyaniline with phthalocyanine and/or sulfonic acid containing polymers and polyaniline in a metal oxide matrix, such as $SiO_2$, $TiO_2$, $ZrO_2$, $V_2O_5$, $WO_3$ and the like.

The electrolyte employed in this invention is comprised of at least one redox active material. This electrolyte may also be comprised of an ionic material. Moreover, the electrolyte can be a liquid or solid.

The electrochromic behavior of the device can be derived from the layer of electrochemically active material or from the layer of electrolyte, or from both layers. By electrochromic behavior it is meant that the material reversibly varies color or transmission of light as the result of an externally applied voltage.

The electrolyte may provide either a source or a sink for ions which are inserted or extracted respectively from the electrochemically active polymeric material layer. In addition, the electrolyte may also provide a mechanism to balance the reaction that causes the change in color to occur in electrochemically active polymeric layer or that causes electroactivity in that layer.

The electrolyte contains a redox active material which can be either a positive redox active material or a negative redox active material. Exemplary positive redox active materials useful in this invention, include, without limitation, metallocenes, such as cobaltocenes, ferrocenes and their derivatives, N,N,N',N'-tetramethylphenylenediamine (TMPD), phenothiazines, dihydrophenazines such as 5,10-dihydro-5,10-dimethylphenazine, reduced methylphenothiazone (MPT), reduced methylene violet bernthsen (MVB), verdazyls, iodides and bromides. On the other hand, exemplary negative redox active materials which may be employed in this invention include, without limitation, bipyridiniums (viologens), pyraziniums, pyrimidiniums, quinoxaliniums, pyryliums, pyridiniums, tetrazoliums, verdazyls, quinones, quinodimethanes, tricyanovinylbenzenes, tetracyanoethylene, polysulfides and disulfides. The choice of the redox active material depends on the electrochemically active polymer and the desired rest state of the device, i.e., dark or clear.

When a negative electrochemically active polymer is employed then a positive redox active material is used in the electrolyte. Similarly, if a positive electrochemically active polymer is employed then negative redox active material is used in the electrolyte. If a dark colored rest state is desired, then the electrochemically active polymer and the redox active material should be selected such as when at rest (i.e., no potential applied to the device), at least one of the electrochemically active polymer or the redox active material is in its colored state. To achieve such a dark colored rest state, generally the redox potential of a negative electrochemically active material is greater than the redox potential of a redox active material or the redox potential of a positive electrochemically active material is less than the redox potential of the redox active material. Exemplary negative electrochemically active polymers include, without limitation, polyviologens, or polymers containing bispyridinium, pyridinium, pyrylium, pyrazinium, pyrimidinium, or quinoxalinium units, polyarylenes and polyheteroarylenes, such as, for example, poly (pyridine-2, 5-diyl), polythiophenes, poly(isothianaphtene) (PITN), polyimides, polyquinones and polydisulfides. Examples of positive electrochemically active polymers include, without limitation, polyarylamines, such as polyanilines, polyarylenes, such as polyphenylenes or polyfluorenes, polyheteroarylenes such as polypyrroles, polyindoles, polythiophenes or PITN, polyarylenevinylenes, such as poly (para-phenylene vinylene) (PPV), polyheteroarylenevinylenes and ferrocene containing polymers.

The electrolyte of this invention may also contain other additives which are not electroactive or electrochromic. These additives can modify the ultraviolet, visible, or near infrared absorption of the device. For example, dyes can be added to electrolyte for tinting or other purposes. Exemplary dyes which may be employed in this invention include, without limitation, azo, phthalocyanine, nitroso, triphenylmethane, squarilium, transition metal complex, perylene, anthraquinone, coumarin, rhodamine and porphyrin dyes, and their derivatives.

Another aspect of this invention is directed to an electrochromic device having a low light transmission or reflectivity in the resting state, i.e., at zero applied potential. Such an electrochromic device comprises a conducting electrode opposing a counter conducting electrode with an electrochemically active material layer disposed on an opposing surface of one of said electrodes and an electrolyte containing at least one redox active material contactingly disposed between said electrochemically active material layer and an other opposing surface of one of said electrodes. At least one of said electrodes is transparent. Significantly, the redox potential of a negative electrochemically active material (e.g., $WO_3$) is greater than a redox potential of the redox active material (e.g., cobaltocene) so that when the electrochemically active material and redox active material are in contact, the device is in a low state of transmission or reflectivity when no potential is applied (i.e., for example, the cobaltocene spontaneously reduces the $WO_3$ layer). Similarly, the same result can be obtained if the redox potential of a positive electrochemically active material (e.g., polyaniline) is lower than the redox potential of a redox active material (e.g., ferrocene). Generally, the difference in redox potential between the electrochemically active material and the redox active material will be at least about 0.02 volts, preferably about 0.1 volts. The electrochemically active materials employed in this electrochromic device include inorganic, organic or blends and composites of inorganic and organic electrochemically active materials.

The electrochromic devices of this invention can be employed to make variable reflectance EC mirrors (e.g. automotive rearview mirrors, etc.). EC mirrors can be obtained by depositing a reflecting layer on the outer face of a transparent substrate disposed on a nonopposing surface of either of the two electrodes. It is also possible to create an EC mirror by using a conductive reflective material for one of the electrodes so that the electrode acts as both a reflector and also as the electronic conductor. Another advantage of using a metallic substrate as a conductor is its high conductivity. For example, the specific conductivity of materials like aluminum, silver, gold, copper, stainless steel, rhodium and the like, is orders of magnitude larger than that of the known transparent oxide conductors. It is also possible to employ a reflector material and a transparent conductor together to create an EC mirror. This may be advantageously employed where there is some non-desirable interaction between the electrochemically active polymeric layer and the reflector material during processing or the operation of the device. Such composites result in a much higher conductive substrate as compared to a device that does not employ a reflector material. The electrochromic devices of this invention prepared in such a manner are useful for constructing larger devices that can color uniformly without a large potential drop in the electrode.

These and other objects, aspects, features and advantages of the present invention will become apparent from the following detailed description of the preferred embodiments taken in conjunction with the accompanying drawings.

DESCRIPTION OF THE PREFERRED EMBODIMENT

The present invention is directed to an electrochromic device, such as a rearview mirror or glazing. The device of this invention has a conductive electrode opposed to a conductive counter electrode with a layer of electrochemically active polymeric material disposed on an opposing surface of one of the electrodes and an electrolyte comprising a redox active material disposed between the electrochemically active layer and an other opposing surface of one of the electrodes. At least one of the electrodes is transparent. The electrolyte fills the void between the electrochemically active layer and the other opposing surface of the electrode and thus is in intimate contact with the opposing surface of the electrode. Significantly, one of the two opposing surfaces of the electrodes of the inventive device is not coated with an electrochemically active material. It is preferable that the present invention further comprise a first transparent substrate that is disposed on the nonopposing surface of a transparent electrode and a second substrate disposed on the nonopposing surface of the other electrode. Both substrates and electrodes of the EC device of this invention are transparent when the EC device of this invention requires substantially complete visual transmission, such as in the case of a window or glazing.

Figure 1:
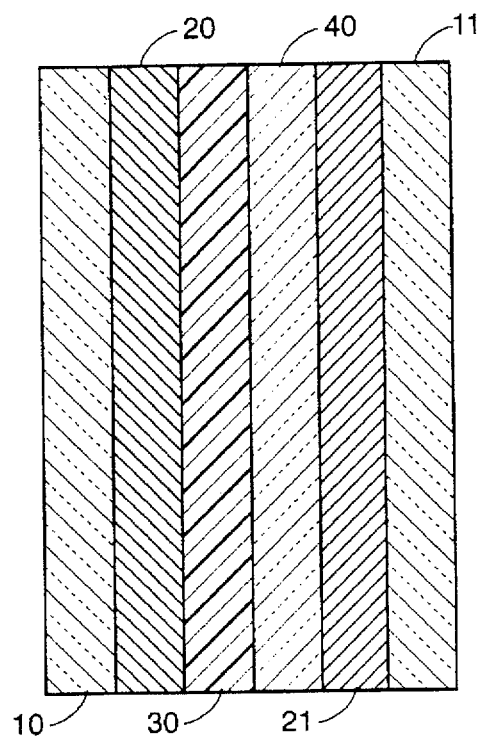
FIG. 1 is a schematic view of an EC window device according to the present invention.

FIG. 1 illustrates an example of an EC window device of this invention having transparent conducting electrodes 20 and 21 coated, respectively, on the opposing surfaces of transparent substrates 10 and 11. A layer of electrochemically active polymeric material 30 is disposed on the surface of electrode 20 facing electrode 21 and an electrolyte 40 comprised of a redox active material is disposed between and in a contacting relationship with electrode 21 and electrochemically active polymeric material 30.

Typically the substrates 10 and 11 of the EC device illustrated in FIG. 1 are transparent glass or plastic such as, for example, acrylic, polystyrene, polycarbonate, allyl diglycol carbonate [CR39 available from PPG Industries, Pittsburgh, Pa.], SAN [styrene acrylonitrile copolymer], poly(4-methyl-1-pentene), polyester, polyimide, etc. It is preferable for the transparent substrates 10 and 11 to be either clear or tinted soda lime glass, preferably float glass. If plastic is employed, it is preferably abrasion protected and barrier protected using a hard coat of, for example, a silica/silicone antiabrasion coating, a diamond-like protection coating or their like, such as is well known in the plastic glazing art. Generally, the substrates have a thickness in the range of about 0.01 mm to about 10 mm, and preferably in the range from about 0.1 mm to 5 mm. However, any substrate of any thickness which will provide a functioning EC device may be employed.

The transparent substrates 10 and 11, both glass and plastic, may have a coating on the outward facing surface. This coating may be an antireflection coating, an antifogging coating, an antiabrasion coating, an ultraviolet absorber coating and mixtures thereof. The substrates can also have a coating, tape or lamination which is an antilacerative, an antiscatter, a colored, a ultraviolet blocking or an IR blocking coating, tape or lamination or mixtures thereof. It is also possible to employ transparent substrates which are specific colored substrates, photochromic substrates, infrared absorbing substrates, reflecting substrates, ultraviolet absorbing substrates and mixtures thereof.

The conducting electrodes 20 and 21 may be of the same or different material and can have different conductivities. At least one of the conducting electrodes must be transparent, although when the EC device is a window device as shown in FIG. 1 then both conducting electrodes 20 and 21 must be transparent. The materials employed for the conducting electrodes are well known to those skilled in the art.

Exemplary conducting electrode materials are coatings of doped indium oxide, doped tin oxide, doped zinc oxide and the like, as well as all thin metallic coatings that are substantially transparent, such as those of gold, silver, aluminum, nickel alloy, and the like. It is also possible to employ multiple layer coatings, such as those available from Libby Owens Ford (LOF) under the tradename of TEC-Glass® or those available from PPG Industries under the tradenames SUNGATE® 300 and SUNGATE® 500. The preferred sheet resistance of these conductive coatings should be below 100 $\Omega/\square$.

The TEC-Glass® and SUNGATE® conductive coated glass comprises a multi-layer thin film structure, which includes a thin coating of fluorine-doped tin oxide with additional undercoating thin film layers disposed between the fluorine-doped tin oxide layer and the underlying glass substrate. This structure inhibits reflected color and increases light transmittance resulting in a non-iridescent glass structure having a low haze (typically less than 5%). The multi-layer coating stack is made from an on-line (preferably in-bath) pyrolytically-coated (preferably by chemical vapor deposition) float glass. The layers undercoating the doped tin oxide typically comprise a silica/silicone layer and a tin oxide layer.

Preferably, the transparent conducting electrode used in this invention is a thin layer of ITO ($In_2O_3$ containing preferably approximately 5 to 20 mole % of $SnO_2$). Typically, the conducting electrodes 20 and 21 are disposed on a substrate of glass or plastic as a coating and the coating has a thickness in the range of about 5 nm to about 10,000 nm, and preferably about 10 nm to about 1,000 nm. However, any thickness of the conducting electrode coating may be employed that provides adequate conductance for the EC device and which does not appreciably interfere with the transmission of light where required.

The electrochemically active polymeric materials 30 which may be employed in the present invention are well known to those skilled in the art. Examples of such electrochemically active polymeric materials have been previously described herein. The preferred electrochemically active polymeric material of the present invention is an organic electrochemically active polymeric layer comprising polyaniline or its derivatives.

The electrochemically active polymer material may further comprise tinting materials, heat stabilizers, UV absorbers/stabilizers and adhesion promoting agents, such as coupling agents, which, for example, may be silane coupling agents, titanium coupling agents, zirconium coupling agents, and the like.

The electrolyte can be solid or liquid. The electrolytes which may be employed in this invention are known and either are readily available or can be prepared by those skilled in the art. An exemplary electrolyte of the present invention is propylene carbonate which contains a redox active material such as, for example, a viologen salt.

Suitable solvents for the electrolyte may be selected, for example, from acetonitrile, 3-hydroxypropionitrile, methoxypropionitrile, 3-ethoxypropionitrile, 2-acetylbutyrolactone, propylene carbonate, ethylene carbonate, glycerine carbonate, tetramethylene sulfone, cyanoethyl sucrose, γ-butyrolactone, 2-methylglutaronitrile, N,N'-dimethylformamide, 3-methylsulfolane, glutaronitrile, 3,3'-oxydiproprionitrile, methylethyl ketone, cyclopentanone, cyclohexanone, benzoyl acetone, 4-hydroxy-4-methyl-2-pentanone, acetophenone, 2-methoxyethyl ether, triethylene glycol dimethyl ether, 4-ethenyl-1,3-dioxalane-2-one, 1,2-butylene carbonate, glycidyl ether carbonates (such as those commercially available from Texaco Chemical Company, Austin, Tex.) silicone-polyol copolymers (such as those available from Genesse Polymer Corporation, Flint, Mich.) and combinations thereof, preferred of which include propylene carbonate.

Figure 2:
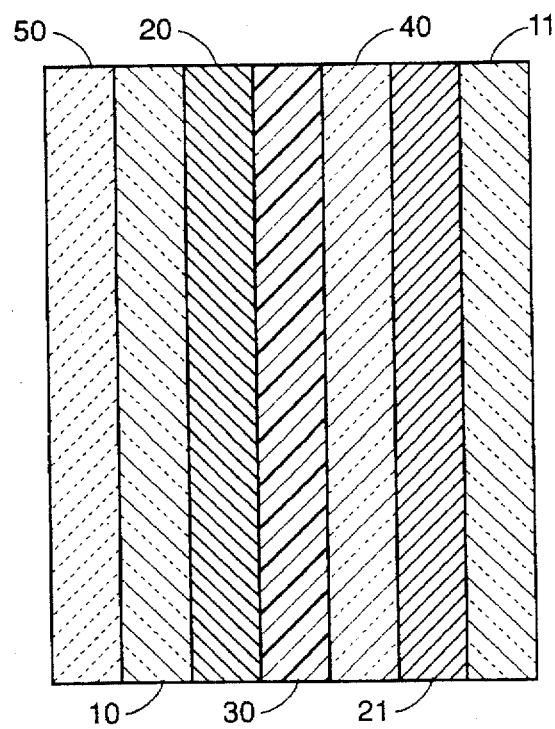
FIGS. 2, 3, 4, 5 and 6 are schematic views of several embodiments of EC mirrors according to the present invention.

An example of an embodiment of an EC automotive rear view mirror of this invention is shown in FIG. 2. The mirror device of FIG. 2 is identical to the device of FIG. 1, with the exception that the mirror device has a reflective coating 50 disposed on the outer surface of transparent substrate 10. The EC automotive mirror device of FIG. 2 can be fabricated by taking a piece of transparent substrate 10 which has a transparent conductive coating 20 and silvering the non-conductive side of one of the substrates 10 or 11 to make it reflective and protected with a polymeric paint using standard wet chemical silvering procedures.

The window device of FIG. 1 can also be prepared using the following steps by simply eliminating the aforementioned silvering step. The substrate/conducting electrode is then coated (on the conductive side) with one of the electrochemically active polymeric materials 30 such as, for example, polyaniline. This coating can be deposited by electro-chemical polymerization, by physical or chemical vapor deposition, or from a liquid phase, such as from a solution, dispersion, suspension or a melt of a polymer, or its like, or from a monomer, where the monomer will polymerize on the conducting electrode 20 disposed on the substrate 10. The medium for this liquid phase could consist in part or completely of a material, e.g., a monomeric composition, that could be further polymerized. After a layer of this medium is deposited as a coating on the substrate, then the coating is formed by the removal of volatile matter (if any) and/or by polymerizing (inclusive of crosslinking if any) this monomeric composition. The process of polymerization can be assisted by application of heat and/or radiation (e.g., UV, IR, microwaves, etc.). This polymerizable material may belong to the class of polymers or copolymers that are used as ion conductors such as polyethylene oxide, polypropylene oxide, polyacrylamide, polymers with sulfonic groups, etc. A preferred method to deposit this coating is by a liquid casting process. This method is easily scalable to large substrate areas and amenable to commercial production at low costs. The thickness of the coating can be between 0.01 and 10 micrometers, but the preferred thickness is in the range of 0.01 to 2 micrometers.

A cell is then constructed by using this substrate/ conducting electrode/electrochemically active polymeric material laminated to another substrate 11 which has only a conductive coating 21. Both the conductive coated sides of the substrates face inward into the cell. The substrates can then be held together [if necessary, such as when the electrolyte to be used is a liquid] at the perimeter edges by a cured epoxy, for example, forming a seal, preferably with a slight offset to attach the bus bars and/or the conducting leads (not shown). The substrates are separated a predetermined distance, typically 10–1000 microns, more preferably 25–500 microns and most preferred 50–150 microns. Generally for large area devices, e.g., an automotive sunroof, the preferred predetermined distance is slightly larger, most preferably 100–400 microns This separation can be accomplished, for example, by either dispensing spacers (e.g., beads, spheres or cylinders) in the seal material or between the two substrates, thus forming a hollow cavity. This cavity can be filled with an electrolyte 40 using the methods described in U.S. Pat. No. 5,140,455, which is incorporated by reference herein as if fully set forth. The seal material (not shown) can be a thermoplastic or thermosetting plastic or an inorganic material, such as a low melting point glass. The cell spacing can also be controlled by using a laminatable or a thermosetting sheet or a double sided tape to form the seal for the cavity. The construction and general assembly of mirrors and glazings are well known as disclosed, for example, in U.S. Pat. No. 5,066,112 and U.S. Pat. No. 5,239,406, both of which are incorporated by reference herein as if fully set forth.

The electrolyte 40 contains a redox active material which itself can be a salt (e.g., a viologen) or a nonsalt (e.g., ferrocene). Additionally, electrolyte 40 may contain a separate ionic source, such as, for example, tetraethylammonium perchlorate (TEAP) or $LiClO_4$. One manner of forming the electrolyte, for example, is by dissolving a viologen salt in propylene carbonate (PC). In addition, a dissociable salt, such as a soluble lithium salt, may be added to the solution. It is important that the solvent and also the resulting solution should have a low affinity for the solid polymeric film 30 so that this film does not peel off the substrate or dissolve while the device is in service.

Monomers with the appropriate polymerization initiators can be utilized as a monomer composition so that after filling the cell this composition can be in-situ polymerized by radiation, heat, or electrogenerated initiators to form a solid electrolyte. Such processes are described, for example, in co-pending U.S. patent application Ser. No. 08/023,675, filed Feb. 26, 1993 and co-pending U.S. patent application Ser. No. 08/193,557, filed Feb. 8, 1994, both of which are hereby incorporated by reference as if the disclosure were fully set forth herein.

Regardless of the procedure followed, the electrolyte can consist of other additives, e.g. tinting materials, UV stabilizers/absorbers, heat stabilizers, infrared absorbing dyes, spacers, moisture scavengers, fillers, viscosity modifiers, etc. The electrolyte 40 can consist of a UV absorber, and the device can be oriented in use such that incident light passes through layer 40 before layer 30. This will cause the UV radiation component to be absorbed before the light reaches the polymer 30. Thus, devices can be fabricated where UV sensitive polymers are used in layer 30. An example is a window configuration where layer 40 faces the light source, e.g. the sun, during use. Another possibility is a UV-stable rearview mirror where layer 40 is used to attenuate the UV before the light reaches layer 30.

The UV spectral characteristics of the device of this invention can be tailored by using more than one UV stabilizer. For example, UV stabilizers available under the tradenames Uvinul® 400 and Uvinul® 3050 from BASF Corporation could be used either alone, or, for example, in a 1:1 mixture.

Although many materials known to absorb ultraviolet radiation may be employed herein, preferred ultraviolet stabilizing agents include "UVINUL" 400 [2,4-dihydroxybenzophenone (manufactured by BASF Corp., Wyandotte, Mich.)], "UVINUL" D 49 [2,2'-dihydroxy-4,4'-dimethoxybenzophenone (BASF Corp.)], "UVINUL" N 35 [ethyl-2-cyano-3,3-diphenylacrylate (BASF Corp.)], "UVINUL" N 539 [2-ethyl hexyl-2-cyano-3,3'-diphenylacrylate (BASF Corp.)], "UVINUL" M 40 [2-hydroxy-4-methoxybenzophenone (BASF Corp. )], "UVINUL" M 408 [2-hydroxy-4-octoxy-benzophenone (BASF Corp.)], "TINUVIN" P [2-(2H-benzotriazole-2-yl)-4-methylphenyl (manufactured by Ciba Geigy Corp., Hawthorne, N.Y.], "TINUVIN" 327 [2-(3',5'-di-t-butyl-2'-hydroxyphenyl)-5-chloro-benzotriazole (Ciba Geigy Corp.) ], "TINUVIN" 328 [2-(3',5'-di-n-pentyl-2'-hydroxyphenyl)-benzotriazole (Ciba Geigy Corp.)], "CYASORB" UV 24

[2,2'-dihydroxy-4-methoxy-benzophenone (manufactured by American Cyanamid Co., Wayne, N.J.)], monobenzoates (available from Eastmann Chemicals, Kingsford, Tenn. and Sandoz Chemical Corp., Charlotte, N.C.), resorcinol monobenzoates, formamidines (available from Givaudan-Roure, Clifton, N.J.), phenylformamidine and combinations thereof, where a suitable range of the ultraviolet stabilizing agents is from about 0.2% (w/v) to about 40% (w/v), with about 5% (w/v) to about 15% (w/v) being preferred. The ultraviolet stabilizing agent should be chosen with an eye toward avoiding an adverse affect on performance and electrolyte function.

In addition, ultraviolet absorbing layers may be coated onto, or adhered to, the first substrate and/or second substrate, and preferably the substrate closest to the source of UV radiation, to assist in shielding the electrochromic device from the degradative effect of ultraviolet radiation. Suitable ultraviolet absorbing layers include those recited in U.S. Pat. No. 5,073,012 entitled "Anti-scatter, Ultraviolet Protected, Anti-misting Electro-optical Assemblies", filed Mar. 20, 1990, the disclosure of which is incorporated by reference herein.

Examples of such layers include a layer of DuPont BE1028D which is a polyvinylbutyral/polyester composite available from E. I. DuPont de Nemours and Company, Wilmington, Del., and SORBALITE™ polymeric UV blockers available from Monsanto Company, St. Louis, Mo.) which comprise a clear thin polymer film with UV absorbing chromophores incorporated, such as by covalent bonding, in a polymer backbone. The SORBALITE™ clear thin polymer film when placed on a surface of the substrate closest to the source of UV radiation (such as the sun), efficiently absorbs UV light below about 370 nm with minimal effect on the visible region. Thickness of the SORBALITE™ film is desirably in the range of about 0.1 microns to 1000 microns (or thicker); preferably less than 100 microns; more preferably less than about 25 microns, and most preferably less than about 10 microns. Also, UV absorbing thin films or additives such as of cerium oxide, iron oxide and titanium oxide or such oxides with dopants can be used to protect the electrochromic device from UV degradation.

Figure 3:
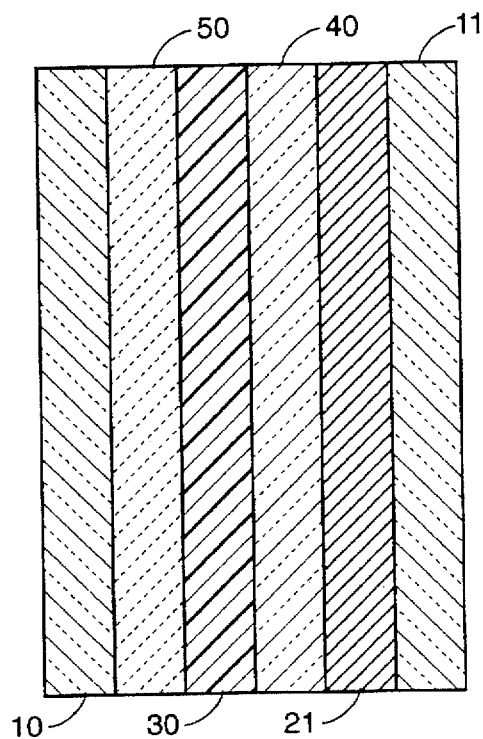
Figure 4:
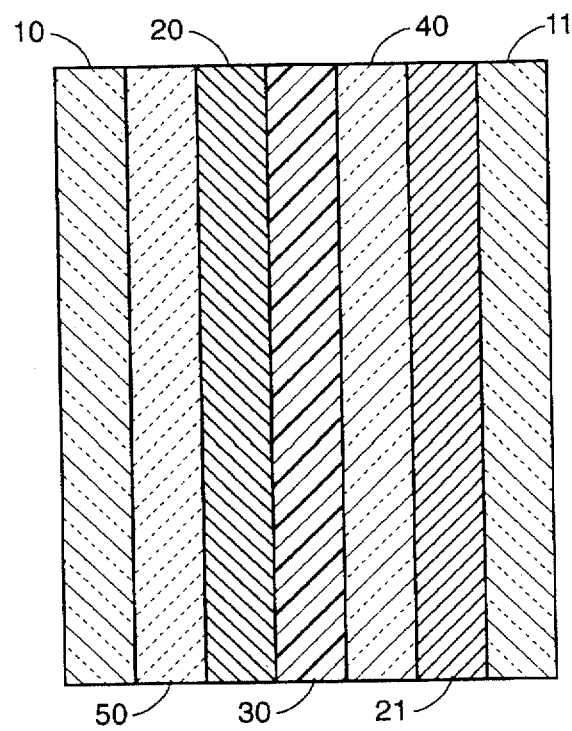
Figure 5:
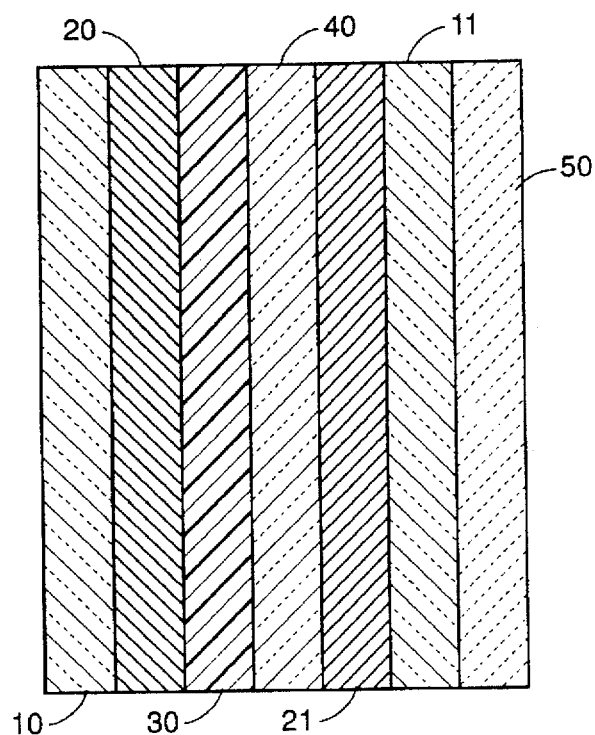
Figure 6:
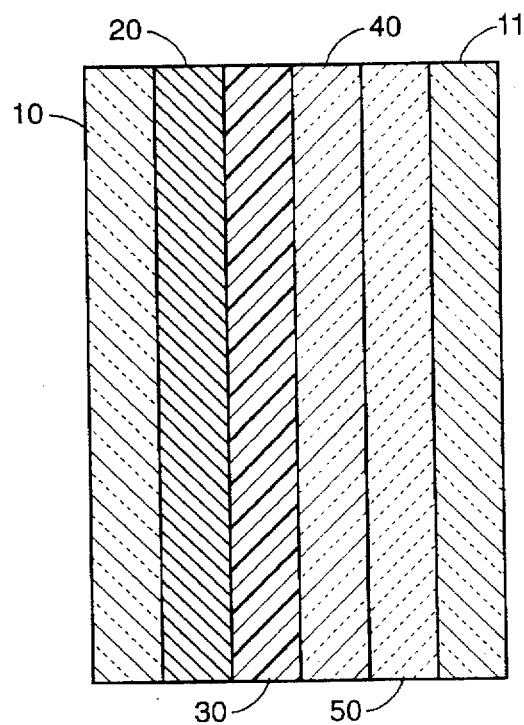

FIG. 3 illustrates an alternative mirror device to that shown in FIG. 2, wherein reflective coating 50 also serves as conducting electrode 20 and thus eliminates the need for a separate reflective coating. In an alternative embodiment shown in FIG. 4, reflective coating 50 is disposed in-between substrate 10 and conducting electrode 20. FIGS. 5 and 6 illustrate additional alternative embodiments of EC mirror devices of this invention wherein the reflective coating 50 is disposed on the outward facing surface of substrate 11 or in-between substrate 11 and electrolyte 40, respectively.

Polyaniline and many of its derivatives, which are the preferred electrochemically active polymeric materials of this invention, are transparent and almost colorless in the reduced state and when oxidized change to green and then to a blue color with further oxidation. When a viologen salt is dissolved in PC, it is colorless in its oxidized state. Therefore, when polyaniline is used as the coating material in layer 30, it is preferred that both components, i.e., the polyaniline coating 30 and the electrolyte 40, be in the transparent state.

For polyaniline coatings, the natural stable state in air is green or blue, i.e., an oxidized state. Hence, for preparing the device of this invention it is preferable to bleach the coating after it has been deposited so that the highest transmission of light can be maintained in the bleached state. This can be accomplished electrochemically or by using chemical reducing agents, such as, for example, sodium hydrosulfite, ascorbic acid, hydrazine or its derivatives in aqueous or nonaqueous solutions. However, as mentioned earlier for the highest transmission in the bleached state, the coating after reduction should then be maintained under inert atmosphere [nitrogen argon, or the like] such that during further processing it is not reoxidized.

Alternatively, polyaniline can be assembled into the cell assembly in the colored state, followed by the in-situ reduction of the coating within the assembly by exposing the interpane void within the cell to reducing conditions such as by filling the cell with a reducing solution. The cell is then drained of the reducing solution, washed and then stored under inert conditions until it is filled with the electrolyte composition.

On the other hand, the polyaniline coating can be prepared from a liquid mixture containing at least one reducing agent or the electrolyte 40 can contain the reducing agent so as to eliminate the separate step of reducing the polyaniline. These processes and devices made therefrom are disclosed in the co-pending U.S. patent application Ser. No. 08/330,090, entitled "Electrochromic Devices with improved Processability and Methods of Preparing the Same", filed Oct. 26, 1994, the disclosure of which is incorporated by reference herein as if fully set forth.

Another method to reduce the coatings is by a gas phase process either before or after the cell fabrication. The cell with the colored coating (or the coated substrate itself) is placed in a chamber. The chamber can then be evacuated to expel any oxygen containing gas such as air. A reducing gas such as hydrazine vapors is then introduced into the chamber to bleach the polymeric coating. If the coating is being reduced in a fabricated cell (before filling), repeated evacuation of the chamber and purging with the reducing gas is preferred.

Another example of an embodiment of this invention is illustrated if the electrochemically active polymeric layer 30 is made out of polyvinylferrocene or polyisothianapthene (PITN). For the former, the solution for the electrolyte layer 40 may consist of a viologen salt dissolved in propylene carbonate (PC). For the latter, PITN is dark blue in the neutral state and transparent in its oxidized state. A cell can be made with transparent PITN as layer 30 and the electrolyte layer 40 may consist of a ferrocene and a salt dissolved in PC. After the cell is filled and sealed, PITN reduces reversibly to a blue color when a negative potential is applied thereto.

Depending on the requirements, there are several choices that are available from which anodic and cathodic compounds can be chosen. Examples of such compounds can be found in the U.S. Pat. No. 5,239,405, which is hereby incorporated by reference as if the disclosure therein where fully set forth.

As noted previously, another aspect of this invention is directed to an electrochromic device having a low light transmission or reflectivity in the rest state, i.e., at no applied voltage. This electrochromic device is illustrated by FIG. 1 as previously described with the exception that layer 30 is an electrochemically active material and either (i) the redox potential of a positive electrochemically active material is less than the redox potential of the redox active material in electrolyte 40, or (ii) the redox potential of a negative electrochemically active material is greater than a redox potential of the redox active material in electrolyte 40.

The electrochemically active materials 30 which may be employed in the present invention are well known to those skilled in the art. Such materials include inorganic, organic or blends and composites of inorganic and organic electrochemically active materials. Exemplary inorganic metal oxide electrochemically active materials include $WO_3$, $V_2O_5$, $MoO_3$, $Nb_2O_5$, $TiO_2$, $CuO$, $Ni_2O_3$, $Ir_2O_3$, $CrO_3$, $Co_2O_3$, $Mn_2O_3$, and the like. The electrochemically active organic materials useful in this invention are generally polymers which have been previously described.

Significantly, the electrochromic devices of this invention having a low light transmission or reflectivity in the rest state employ an electrochemically active material 30 having a redox potential that differs from the redox potential of the redox active material in electrolyte 40 in the manner described above. The electrochemically active material and the redox active material may be chosen from a wide variety of materials so long as the above-described difference in redox potential is met. The electrochromic behavior of the device may be derived from the layer 30, or from the layer 40 or from both of them. In this embodiment of the invention, the electrochromic device has a low light transmission or reflectivity in the rest state, i.e., when no potential is applied. When a potential is applied the light transmission or reflectivity of the device will increase. The light transmission or reflectivity of the device will revert to a low level when the applied potential is removed.

The electrolytes useful in this invention, which have been previously described, contain a redox active material. If a solvent is used in the electrolyte, the solvent should have a low affinity for the electrochemically active material layer so that the layer does not peel off the electrode or dissolve.

The redox active materials useful in this embodiment of the invention are well known to those of ordinary skill in the art and may additionally contain a separate ionic source. A particularly preferred redox active material for use with a $WO_3$ electrochemically active material layer is selected from metallocenes and their derivatives, most preferably cobaltocene. It is also preferred to employ an ionic source with cobaltocene and its derivatives, such as, for example, $LiClO_4$, $LiBF_4$, $LiPF_6$, $LiCF_3SO_3$, $Li(CF_3SO_2)_2N$ or mixtures thereof.

Tungsten oxide and similar metal oxides are transparent and colorless in their natural stable oxidized state and when reduced change to a dark color. For $WO_3$ coatings, the natural stable state in air after solgel deposition or PVD (plasma vapor deposition) is transparent, i.e., in an oxidized state. The redox potential ($E_{WO3}$) of $WO_3$ is in the range of about 0.0V to about $-1.2V$. In a prior art electrochromic device, ferrocene may be used as the redox additive. Since the redox potential of ferrocene ($E_{FC}=+0.5V$) is higher than $E_{WO3}$, the device will stay in a bleached state after filling. Hence, in such a device, the absorption at rest (V=O) of the coating after device construction is usually the same as the absorption of the coating which was used to make the device. However, if cobaltocene is used instead of ferrocene, the device will spontaneously color, since the redox potential of cobaltocene ($E_{cc}=-1.1V$) is lower than the coloration potential of the $WO_3$ film.

Polyaniline and many of its derivatives are transparent and almost colorless in the reduced state. When oxidized, polyaniline and its derivatives change to green (at about +0.2V) and then to a blue color with further oxidation. Hence, for the electrochromic device, a redox additive which is a good oxidizing agent for polyaniline will generally be selected to obtain a low light transmission or reflectivity device when no potential is applied. For example, the oxidized form of polyaniline can be used, in conjunction with the reduced form of the appropriate redox additive, such as ferrocene ($E_{FC}=+0.5v$). After filling of the device, it will remain in a dark state. When a negative potential is applied to the polyaniline (PANI) electrode of such a device, it will bleach, since PANI is reduced and ferrocene oxidized to ferrocenium cation at the other electrode. Disconnecting the leads will cause the device to color again, as ferrocenium will oxidize PANI to its colored state.

The electrochromic device of this invention having a low light transmission or reflectivity in the rest state may be prepared in the same manner as previously described. The only requirement is that the redox potential of the electrochemically active material must be matched with redox potential of the redox active material as described above.

The EC devices of this invention are particularly useful as electrochromic mirrors or automotive glazings, such as sun roofs, sun visors, shade bands, or windows, like windshields, side windows or back lights.

The electrochromic mirrors of the present invention are suitable for use as automotive electrochromic rearview mirrors (e.g., truck mirrors, interior and exterior mirrors for motor vehicles) including interior rearview mirrors and exterior flat, convex and aspherical automotive mirrors, architectural mirrors or specialty mirrors, like those useful in aeronautical, periscopic or dental and medical applications.

In addition to electrochromic automotive glazings and mirrors, electrochromic devices, such as architectural glazings, like those useful in the home, office or other edifice; aeronautical glazings, such as those which may be useful in aircraft; electrochromic optically attenuating contrast filters, such as contrast enhancement filters, suitable for use in conjunction with cathode ray tube monitors and the like; electrochromic privacy or security partitions; electrochromic solar panels, such as sky lights; electrochromic information displays; and electrochromic lenses and eye glass, may also benefit from that which is described herein.

The examples which follow are intended as an illustration of certain preferred embodiments of the invention, and no limitation of the invention is implied.

EXAMPLE 1

Preparation of Coatings of Polyanilines

Coatings of polyaniline and its derivatives were prepared in several ways.

A. Electrochamical Polymerization

The first method was by electrochemical polymerization. Electrochemical polymerization of aniline on conducting glass was conducted as described in the literature (A. F. Diaz, J. A. Logan, J. Electroanal. Chem. 1980, 111, 111) and (T. Kobayashi, H. Yoneyama, H. Tamura, J. Electroanal. Chem. 1984, 161, 419). The anode was a piece of ITO glass and the cathode was a platinum foil. A liquid mixture of aniline (1.5M) in 3M HCl, degassed by bubbling nitrogen into it, was electrolyzed by applying a constant potential of 0.9 V between the ITO anode and a platinum foil counter electrode. After 1 hour, the polyaniline (PANI) film was rinsed with deionized water and dried. The anode was also primed, for example with a solution of 3-aminoproplytriethoxysilane and indium acetylacetonate in ethanol to improve adhesion of the polyaniline film.

B. In situ Polymerization

The second method to make the polyaniline and other electroactive films was by in situ polymerization. For example, a thin film of polyaniline was deposited on a conducting glass substrate by the following method. A cold liquid mixture of ammonium persulphate (3.12 g, 0.25M) in HCl (65 mL 1.5M) rapidly added to a cold liquid mixture of aniline (2.86 g, 0.5M) in HCL (65 mL, 1.5M) and the resulting liquid mixture was quickly poured onto a clean substrate made of TEC 10 glass (12×12 in.) carefully maintained in a horizontal position. Conductive substrates suitable for electrochromic devices can be tin oxide coated glass (TEC 10 conductor coated glass of sheet resistance 10 ohms/square or TEC 20 conductor coated glass of sheet resistance 20 ohms/square), but also ITO glass, metal coated glass or even bulk metals. The liquid mixture rapidly turned dark blue, and after 15 minutes, the mixture was washed off the surface of the substrate which was rinsed several times with HCl (1.5M), then isopropyl alcohol, and finally air dried. A homogeneous film of polyaniline was left on the surface of the conducting glass. its thickness was about 850 Å, as measured with a surface profilometer. A method using sulfuric acid instead of hydrochloric acid has been described by T. Meisel, R. Braun, Proc. SPIE, Vol. 1728, 200–210 (1992), while another method using other oxidizing agents is described in U.S. Pat. No. 4,842,383.

C. Liquid Casting

The third method was by liquid casting. For this method, polyaniline powder (Emeraldine base) was prepared according to the procedures found in the literature (Y. Cao, A. Andretta, A. J. Heeger, P. Smith, Polymers, 1989, 30, 2305). In a typical run, a solution of ammonium persulfate (57 g, 0.25 mol) in 200 mL of 1.5M HCl was slowly added to a cooled solution of aniline (46.5 g, 0.5 mol) in 500 mL of 1.5M HCl, under inert atmosphere. The temperature of the reaction mixture should be maintained below +60° C., but preferably it should be chosen between 0° C. and 20° C. and kept constant during the entire period of addition (ca. 1 hr) and during one more hour after the end of the addition of the oxidant. In this example the temperature of the reaction mixture was maintained at approximately 0° C. The polyaniline (emeraldine hydrochloride) was collected by filtration of the mixture on a Büchner funnel, washed with deionized water (5×500 mL), then stirred 8 hours in 1 L of 3% aqueous ammonium hydroxide under inert atmosphere. The polyaniline was then filtered on a Büchner funnel, washed with water (3×500 mL), washed with methanol (3×200 mL), and finally dried under dynamic vacuum at 60° C. until a constant weight was reached (18.2 g).

The same procedure was used to synthesize derivatives of polyaniline, as well as copolymers of aniline and substituted anilines such as o-anisidine, 2,5-dimethoxyaniline, o-toluidine, 2-ethylaniline, N-methylaniline, and others.

For example, the polymerization of ooanisidine was conducted as follows. A solution of ammonium persulfate (28.75 g, 0.126 mL in 100 ml of 1.5M HCl) was slowly added to a cooled solution of o-anisidine (30.87 g, 0.251 mL in 400 mL of 1.5M HCl), under an inert atmosphere. Again, the temperature of the reaction mixture should be maintained below +60° C., but preferably it should be chosen between 0° C. and 20° C. and kept constant during the entire period of addition and during one more hour after the end of the addition of the oxidant. In this case, the temperature of the reaction mixture was held at approximately 1° C. The poly(o-anisidine) was then filtered on a Büchner funnel, washed with water (3×300 mL), and neutralized with 3% aqueous ammonium hydroxide. The polymer was then filtered on a Buchner funnel, washed with water (3×300 mL), washed with methanol (5×150 mL), and finally dried under dynamic vacuum at 60° C. until a constant weight was reached (7.75 g). Polyaniline liquid mixtures were then made in organic solvents such as N-methylpyrrolidinone (NMP) (M. Angelopoulos, G. E. Asturias, S. P. Ermer, A. Ray, E. M. Scherr, A. G. MacDiarmid, M. Akhtar, Z. Kiss, A. J. Epstein, Mol. Cryst. Liq. Cryst. 1988, 160, 151–163.) or 88% formic acid (A. G. Green, A. E. Woodhead, J. Chem. Soc. 1910, 97, 2388.). Other organic and mineral acids or mixtures can also be used as solvents such as 80% aqueous acetic acid, or 98% sulfuric acid.

For example, 20 g of polyaniline (emeraldine base) prepared as above was stirred overnight in 1000 ml of 88% aqueous formic acid under inert atmosphere. The dark green liquid mixture so formed was filtered several times on 1.5 µm glass filter to remove residual solids. Similarly, 2 g of poly(o-anisidine) was stirred in 60 mL of 88% aqueous formic acid for 5 hours and then filtered on 1.5 µm glass filter.

Polyaniline and other derivatives can also be made more mixable in a wide range of organic solvents or with other polymers when they are complexed with large ions. For example, polyanilines complexed with camphorsulfonic acid or dodecylbenzenesulfonic acid are soluble in chloroform and toluene, respectively (U.S. Patent Application, 1991, Ser. No. 07/800,555 and Ser. No. 07/800,559. see also A. J. Heeger and also Y. Cao, P. Smith, A. J. Heeger, Synth. Met. 1992, 48, 91.). Blends of these materials can be made with several polymers, an example being polyvinylbutyral. The above described liquid mixtures can be used to form coatings by casting, wire or roller coating, spin coating, dip coating, curtain coating, spraying, or other standard techniques.

EXAMPLE 2

Reduction of Polyaniline Coatings

Electrochemically active polymeric coatings in general and polyaniline coatings in particular can be incorporated into a device either in their oxidized or their reduced form.

Method a: Incorporation in its Reduced Form

In a number of the EC cells, polyaniline was incorporated into the device in its reduced form. Several reagents and procedures were used to reduce these films to a colorless state.

In one method, the colored polyaniline coatings were dipped into a freshly prepared solution of sodium dithionite (2% w/w) in deoxygenated water. Within a few minutes, depending of the coating thickness, the coatings became completely transparent. They were then rinsed with deoxygenated water, dried and stored under nitrogen.

In another method, the polyaniline films were reduced with L-ascorbic acid solutions. For example, the coatings can be dipped into an aqueous solution of ascorbic acid (4% w/w). Within a few minutes, depending on the film thickness, the polyaniline films were partially reduced to a very light green state. Complete reduction was achieved by applying for a few seconds a negative potential to the film, while a stainless steel counterelectrode dipping in the same ascorbic acid solutions was connected to the positive potential of a power supply. The reduced polyaniline films were rinsed with deoxygenated water, dried and stored under nitrogen. Alternatively, it is also possible to reduce polyaniline coatings to a transparent colorless state with aqueous L-ascorbic acid solutions whose pH has been adjusted to 10–11 by adding a base, for example 30% ammonium hydroxide solution. Non-aqueous solutions can also be used. For example, to a solution of ascorbic acid (0.4 g) in 20 g of degassed methanol was added four drops of the base, 1,8-Diazabicyclo[5.4.0]undec-7-ene (DBU). This freshly prepared solution was able to reduce polyaniline coatings within a few minutes. The colorless transparent coatings were rinsed with methanol, air dried, and stored under inert atmosphere.

In yet another method, the polyaniline films were dipped into about a 1% to 10% (w/w) solution of phenylhydrazine in methanol or ethanol. Within a few seconds to a few minutes, depending of the film thickness, the films became transparent and colorless. They were rinsed with deoxygenated methanol, then dried and stored under nitrogen. Alternatively, this reduction step was conducted on a spin coater (EC101D model, Headway Research, Inc.). The glass substrate was first rinsed several times with methanol, covered with a 1% to 10% (w/w) solution of phenylhydrazine in methanol for about one minute while still, then spun to remove the reducing solution, and rinsed several times with methanol. The reduced films were dried and stored under nitrogen.

In still another method, the polyaniline coatings on conductive glass substrate were placed in a vacuum chamber which was evacuated to 0.1 to 1 torr. The chamber was then filled with a reducing gas such a sulfur dioxide, or vapors of hydrazine or phenylhydrazine at a pressure of about 1 atmosphere. This cycle was repeated several times until the polyaniline films were completely transparent. This method can also be used to reduce a polyaniline film after the cell fabrication, as described thereafter, and is specially useful for cells having only one filling hole.

Method b: Incorporation in its Oxidized Form Followed by Reduction

In this method, polyaniline coatings were incorporated into the cell in their oxidized form, and thereafter were reduced to a colorless state. Several reagents and procedures were used to reduce these films to a colorless state.

For example, a cell was first constructed by using a conductive substrate coated with an oxidized polyaniline film and another substrate which has only a conductive coating. The two substrates, conductive side facing inwards into the cell, were sealed together at the edges with an epoxy seal material containing glass microbeads as spacers. The cell had two filling holes placed at two diagonally opposed corners, allowing the filling and emptying of the cell cavity with various fluids. The holes can be formed in the seal by removing the epoxy on a length of a few millimeters before assembling and curing, or simply by drilling in the glass substrates. While the glass substrate can be drilled after the assembly of the cell, preferably the substrate is drilled before cell assembly. In this case the substrate was drilled before the deoxgynated aqueous sodium hydrosulfite solution (1% w/w) was injected into the cell with a syringe through one of the filling holes. Within a few minutes, the polyaniline coating inside the cell was reduced to a transparent colorless film. The cell was rinsed by injecting deoxygenated water with a syringe through the filling holes, and dried with a flow of argon or nitrogen flowing from one filling hole to the other. To accelerate the drying process the cell can also be submitted to a final rinse with a water soluble low boiling point organic solvent such as alcohols.

In another procedure, a cell was made with a polyaniline coated substrate and a conducting glass counter electrode, as described above. The cell thickness was about 105 μm. Two holes, approximately 1 mm in diameter, were drilled at two opposite corners of the cell. To reduce the PANI film, the cell was flushed with a deoxygenated aqueous solution of sodium hydrosulfite, rinsed with deoxygenated water, and dried under a flow of argon.

The same procedure can be used with different reducing agents. For example, a solution of phenylhydrazine in methanol or other organic solvents can be used to reduce polyaniline coatings already incorporated into a cell. The reducing solution can easily be introduced into a cell if there is a large aperture or at least two holes to allow the air to escape during the filling, rinsing, and drying procedures. It is sometimes preferable to make cells with only one hole. In that case, vacuum backfilling procedures can be used to inject and remove the reducing and rinsing solutions into the cells, such as described, for example, in previously incorporated U.S. Pat. No. 5,140,455.

For example, a cell made with polyaniline coating in its oxidized form (dark blue) and having a single hole for vacuum backfilling, was placed in a vacuum chamber. The chamber was then evacuated to expel the air at a pressure of about 0.1 to 1 torr. A reducing gas consisting of argon saturated with hydrazine vapors was then introduced into the chamber, the final pressure being about 1 atm. The polyaniline coating slowly became transparent around the filling holes. Repeated evacuations of the chamber and purging with the reducing gas were necessary to obtain a fully colorless polyaniline coating. Finally, the chamber and the cell were evacuated and filled with argon several times to remove unreacted hydrazine vapors and the by-products of the reduction process.

EXAMPLE 3

Preparation and Reduction of Polyaniline Coatings in One Step

Polyaniline thin coatings were obtained in their reduced form directly from a liquid containing polyaniline. When a stoichiometric amount or an excess amount of reducing material such as phenylhydrazine was added to a mixture of 2% w/v of polyaniline in 88% aqueous formic acid, the mixture changed slightly in color. This composition was used to spin cast or dip coat glass substrates to give very light green films. These polyaniline films turned completely transparent after heating at about 100° C. in vacuum or in air for a short time. The FT-IR spectra of these films were identical to those reported in the literature for leucoemeraldine base (I. Harada, Y. Furukawa, F. Ueda, *Synth. Met.* 1989, 29 E303.). The films turned blue in a few days upon exposure to air, indicating reoxidation.

EXAMPLE 4

EC windows devices with an in situ polyaniline film

A thin film of polyaniline was deposited on a conducting glass substrate by the in situ polymerization method described above in Example 1. The substrate was a piece (6×3 in.) of TEC 10 glass (available from LOF). A cell was constructed in the same manner as described in Example 2 with this polyaniline coated substrate and another piece of TEC 10 conducting glass. The cell interface thickness was 105 μm. Two holes (1 mm diameter) were drilled at two opposite corners of the cell. To reduce the PANI film, the cell was flushed with a deoxygenated aqueous solution of sodium hydrosulfite (0.0575M), rinsed again with propylene carbonate (PC), and dried under a flow of argon.

The cell was then filled with a solution of ethyl viologen diperchlorate (0.31 g, 0.075M), in PC (10 mL). When a potential of 1.0 V was applied to the polyaniline coated electrode, the transmission (measured at 550 nm) of the cell changed from 68% T to 20% T in about 30 sec. After 30,000 cycles no substantial change in depth of coloration or coloring speed was observed.

Another similar cell was made with TEC 20 glass. The cell had a 300 μm gap which was filled with a solution of tetracyanoquinodimethane (TCNQ, 0.204 g, 0.1M), tetrabutylammonium tetrafluoroborate (TBAF, 0.392 g. 0.5M) in γ-BL (gamma-butyrlactone) (10 mL). When a potential of +1.0 V was applied to the polyaniline coated electrode, the transmission (measured at 550 nm) of the cell changed from 49.4% T to 38.8% T in about 25 seconds.

A window device was also made where the rest state (that is with no applied potential) was dark. Such a device may be particularly preferred for use in an automotive sunroof. The polyaniline coatings were not reduced before filling the cell with the electrolyte.

Another TEC 20 cell as described above was filled with a solution of butyl ferrocene (0.242 g, 0.1M), lithium triflate (0.78 g, 0.5M) in PC (10 mL). After filling, the cell was green and had a low transmission. When a potential of −1.0 V was applied to the polyaniline coating, the transmission of the cell increased from 10% T to 37% T, measured at 550 nm. When the voltage was removed, the device returned to its initial low transmission state.

EXAMPLE 5

EC mirror with a polyaniline film

A variable reflectivity mirror (10×2.5 in.) was constructed using a conductive glass and a polyaniline coating prepared as in Example 1, by in situ polymerization on a conducting glass substrate (TEC 20) which was mirrored on the non-conducting side. The cell thickness was about 100 μm. The PANI film was reduced by the procedure set forth in Example 2, method b, employing a deoxygenated aqueous solution of sodium hydrosulfite. The cell was then filled with a solution of ethyl viologen diperchlorate (1.03 g, 0.25M) in PC (10 mL). When a potential of +1.0 V was applied to the polyaniline coated electrode, the reflectivity (measured at 550 nm) of the cell changed from 72% R to 10% R in about 6 seconds.

EXAMPLE 6

Polyaniline Coating from NMP Solutions

A thin film of polyaniline was deposited on a conducting glass substrate from a N-Methylpyrrolidinone (NMP) liquid mixture. The above liquid mixture was made by stirring overnight at room temperature 2 g of PANI (Emeraldine Base) in 100 mL of NMP. The dark blue liquid that resulted was then filtered on glass frit.

To 2.5 mL of this liquid was added 0.25 mL of a 1% (w/w) solution of FC 430 surfactant in NMP. FC 430 is available from 3M Corporation and was found to improve significantly the wettability of ITO coated glass with the NMP liquid mixture. The resulting liquid mixture was spread onto half wave ITO glass using a wire wound roll (standard 16" all stainless steel rod, ½" diameter, wire size #6, available from Paul N. Gardner Company) and was allowed to dry at room temperature overnight. The film was subsequently placed in an oven at 100° C. for one hour to remove most of the solvent.

As described in Example 2, a cell (5×2 in.) was made with this polyaniline coated ITO substrate and another piece of half wave ITO conducting glass. The cell thickness was about 105 μm. The polyaniline film was reduced to a colorless state as previously described by filling the cell with a deoxygenated solution (1% w/w) of phenylhydrazine in methanol, rinsed with deoxygenated methanol, then with PC, and dried under a flow of argon. The cell was filled with a solution of ethyl viologen diperchlorate (0.25M) in PC containing 6% (w/w) of 2,4-dihydroxybenzophenone as a UV absorber (available under the tradename Uvinul® 400 from BASF Corporation). When +1.2 V was applied to the polyaniline coated electrode, the transmission of cell changed from 78% T to 26% T (measured at 550 nm) in about 4 sec.

EXAMPLE 7

EC window devices with PANI:CSA Complex

Two 3×3" inch windows were made using polyaniline: camphorsulfonic acid/polyvinylbutyral (PANI:CSA/PVB) coatings cast onto TEC 20 glass. The counter electrodes were also TEC 20 glass. The cell thicknesses were 105 μm. One film was cast using DMSO as the solvent for PANI. The window was first reduced as in Example 2, method b, and then filled with ethyl viologen diperchlorate (0.4M), of 10% (w/w) polymethylmethacrylate (PMMA) in PC. This window colored from 65% T to 19% T in 8 seconds at 550 nm when +1.0 V was applied. The second film was cast from m-cresol and the window was reduced as before and filled with the same electrolyte. The window colored from 75% T to 19% T in 8 seconds at 550 nm when +1.0V was applied.

EXAMPLE 8

EC mirrors with polyaniline coating deposited from Aqueous Formic Acid

An interior rearview mirror of the shape for a Range Rover vehicle produced by the Rover Motor Company, England was prepared as follows. A 2% (w/v) liquid composition of PANI was made by stirring 20 g of PANI (Emeraldine Base) in 1000 mL commercially available 88% aqueous formic acid (FA), overnight at room temperature. The mixture was filtered through a 1.5 μm glass filter to remove residues. A 1.3% (w/v) liquid composition of PANI was made by adding 10 mL of FA to 20 mL of the 2% (w/v) PANI liquid composition prepared above. A thin film of polyaniline was spin-cast onto a conducting substrate from this formic acid composition. The substrate was half wave ITO glass (10×2.5 in.) mirrored on the non-conductive side. The polyaniline coating was reduced before the cell assembly, in accordance with the procedure set forth in Example 2, method a. The reduction step was easily conducted with the substrate on the spin coater. The polyaniline coating was first washed with deoxygenated methanol, spun a few seconds to remove excess methanol, then reduced for a few minutes using a 4% (w/w) solution of phenylhydrazine in deoxygenated methanol. The substrate was spun again to remove excess reducing solution, and then washed with deoxygenated methanol. The film was dried overnight under vacuum. As described above, the cell was assembled using this film and another piece of conducting glass. Cell assembly and epoxy curing took place under an inert atmosphere of argon. The cell thickness was about 105 μm. The cell was filled with a solution of ethyl viologen ditriflate (0.768 g, 0.1M) and Uvinul® 400 (1.07 g, 0.33M) in PC (15 mL). With +1.0V applied potential, the cell colored from 72.6% R to 20% R (photopic filter) in 3.1 seconds. When zero volts was applied, the cell rapidly bleached to its initial high reflectance state. The rearview mirror continued to show excellent electrochromic response after 61,000 cycles at room temperature, was successfully test driven in an automobile and exhibited heat stability, UV stability and general performance suitable for use in an automobile.

EXAMPLE 9

Mirror with a Solid Electrolyte

A thin film of polyaniline was spin-cast from 1.5% (w/v) polyaniline liquid mixture in formic acid. The film was reduced on a spin coater as described in Example 2, using 4% (w/w) phenylhydrazine in deoxygenated MeOH. Two cells were assembled and the epoxy cured under an inert atmosphere. The cell thickness was about 105 μm. One of the cells was filled with a monomer composition consisting of ethyl viologen ditriflate (0.768 g), Uvinul® 400 (1.07 g), Quick Cure® B566 resin (2.67 g) and PC (17.8 g). Quick Cure® B566 is the tradename for a UV curable acrylated epoxy urethane resin available from Specialty Coating Systems, Union Carbide. After filling, this composition was placed into the cell cavity and was polymerized to a solid in a UV chamber for 1.5 hours. When +1.0V was applied to the polyaniline coated electrode, the reflectivity (photopic filter) of the cell changed from 68.8% R to 8.6% R in about 8 seconds. When −0.3 V was applied, the reflectivity changed from 8.7% R to 68.8% R in about 30 seconds.

EXAMPLE 10

Synthesis of a Viologen Salt

Ethylviologen triflate was synthesized. In a dry box (less than 1 ppm $O_2$ and $H_2O$), ethyl triflate (14 mL, 0.108 mol) was slowly added to a magnetically stirred solution of 4,4'-bipyridine (7.8 g, 0.05 mol) in 50 mL of anhydrous acetonitrile. After 2 hours of stirring at room temperature, the flask was taken out of the dry box and the solvents were distilled off. The white solid left was washed with diethyl ether, filtered, and recrystallized in methanol/diethyl ether to give 21.85 g of white crystals. The $^1$H NMR in $D_2O$ was consistent with the proposed structure, as well as the elemental analysis. Calculated for $C_{16}H_{18}N_2F_6S_2O_6$: C, 37.5; H, 3.5; N, 5.5; F, 22.3; S, 12.5. Found: C, 37.47; H, 3.60; N, 5.46; F, 21.71; S, 12.67. The proposed structure of ethyl viologen diperchlorate is represented by the following formula I:

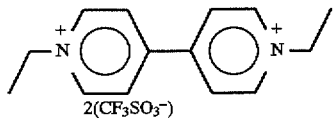

2(CF$_3$SO$_3^-$)

Ethyl viologen diperchlorate may be hazardous to handle because of the known explosive properties of the perchlorate salts. In this regard, ethyl viologen ditriflate is safer to use than the perchlorate salt.

Furthermore, this trillate salt is easy to prepare and dissolves more readily in PC than the ethyl viologen diperchlorate salt does. We also found that the long term stability of electrochromic devices made with polyaniline coatings and a viologen salt improved when ethyl viologen ditriflate was used instead of ethyl viologen diperchlorate.

EXAMPLE 11

EC Device with a Polyaniline Coating that is Coated and Reduced in One Step

A liquid composition of partially reduced polyaniline was prepared by adding 3 mL of a solution of 10% phenylhydrazine in 88% aqueous formic acid to 5 mL of a 2% (w/v) polyaniline mixture in 88% formic acid. The liquid composition was spin cast on half wave ITO glass, mirrored on the non-conductive side (10×2 in.) and dried at 70° C. in a vacuum oven to give a transparent film of leucoemeraldine base.

As described in Example 7, a cell was assembled under argon by covering this substrate with another piece of ITO glass and epoxy adhesive containing 53 μm glass spacers deposited on the edges of the substrate. The cell was cured for 1 hour under inert atmosphere and then vacuum backfilled through a hole left in the epoxy with a solution of ethyl viologen diperchlorate (0.1M), lithium perchlorate (1.0M), 6% (w/w) Uvinul® 400 in PC. When +1.0 V was applied to the polyaniline coated electrode, the reflectivity of the cell changed from 65% R to 11% R (measured at 550 nm) in about 12 seconds. When −0.3 V was applied, the reflectivity changed from 11% R in about 16 seconds.

EXAMPLE 12

EC Device with a polypyrrole (PPY) film

A thin film of polypyrrole was deposited on a conducting glass substrate by the same in situ polymerization method described above for polyaniline. A cold solution of ammonium persulphate in water (50 mL, 0.1M) was rapidly added to a cold solution of pyrrole in water (50 mL, 0.2M) and the resulting liquid mixture was poured onto a clean substrate of tin oxide coated glass (TEC 20). The liquid mixture turned rapidly black and after 3 minutes, the mixture was washed off the surface of the substrate which was rinsed several times with deionized water, then with methanol, and finally air dried. A homogeneous film of polypyrrole was left on the surface of the conducting glass. its thickness was about 500 Å, as measured with a surface profilometer.

As described above, a cell was made with this PPY coated TEC 20 glass and another piece of TEC 20 conducting glass having two filling holes in two opposite corners. The cell thickness was about 105 μm. To insure complete reduction of the PPY film, the cell was filled with a deoxygenated aqueous solution of sodium thiosulfate (1% w/w), rinsed with deoxygenated water, and dried under a flow of nitrogen. The cell was then filled with a solution of ethyl viologen perchlorate (0.4M) in GBL (γ-butyrolactone) and the filling holes were sealed with an epoxy glue. When a potential of +1.0 V was applied to the polypyrrole coated electrode, the transmission of the window changed from 30% T to 20% T at 660 nm in about 10 seconds, and from 30% T to 10% T at 1300 nm in about 10 seconds.

EXAMPLE 13

EC Devices with a non conjugated redox polymer film

Polyviologens are colorless in their oxidized state and colored in their reduced form. However, they are not as good electronic conductors as polyaniline in its doped form. The poor electronic conductivity of polyviologens can be increased by adding conductive powders such as W-10 (N. Oyama et al. *J. Macromol. Sci. Chem.* 1989, A26, 593.). Such polymers can be prepared according to the procedures found in the literature (A. Factor, G. E. Heinsohn, *Polymer Letters*, 1971, 9, 289).

For example, poly(p-xylyl-4,4'-bipyridyl dibromide) was synthesized by reacting 4,4'-bipyridine (1.56 g, 0.01 mol) with α,α'-dibromo-p-xylene (2.63 g, 0.01 mol) in dry acetonitrile (50 mL) under argon for 21 hours. The resulting polymer was isolated by filtration, washed with acetonitrile, and dried under vacuum to give 3.74 g (89.2% yield) of yellow solid. The UV-Vis spectrum of this polymer in solution in water showed a peak at 262 nm, in accordance with previously published data.

A liquid composition was made by adding 0.25 g of the polyviologen dibromide prepared above in 10 mL of 88% aqueous formic acid. This composition was used to spin cast films of polyviologen on half wave ITO coated glass (2.5×5 in.) mirrored on the non conductive side. The thickness of these polyviologen films was between 1000 and 1500 Å. Variable reflectance rearview mirror cells (2.5×5 in.) were then assembled with an ITO coated glass counter electrode, as described above. The gap between the two electrodes was 105 μm.

The cell described above was filled by a vacuum back filling technique with a solution of ferrocene (0.05M) as the redox material, lithium perchlorate (0.1M), and (w/w) Uvinul® 400 in PC. When −1.0V was applied to the polyviologen coated electrode, the reflectance (photopic filter) changed from 79.7% to 16.7% in about seconds. When +0.3V was applied to the colored polyviologen coated electrode, the reflectance of the cell went back to 79% in about 10 seconds.

Another cell as described above was filled with a solution of N,N,N′,N′-tetramethylphenylenediamine (TMPD) (0.1M) as the redox material, lithium triflate (0.1M), and 6% (w/w) Uvinul® 400 in GBL. When −1.0V was applied to the polyviologen coated electrode, the reflectance changed from 73.7% to 19.9% in about 25 seconds. When +0.0V was applied to the colored polyviologen coated electrode, the reflectance of the cell went back to 60% in about 3.1 seconds.

EXAMPLE 14

EC Blue Rest State Mirror with a Polyaniline Coating

A film of polyaniline 220 nm thick, was prepared as given in Example 1, method c. The substrate was half wave ITO glass, about 2×2 in. This substrate was assembled into a cell. Another half wave ITO conductive glass substrate was used as the counter electrode. The cell was assembled by sealing these two substrates at the edges with an epoxy glue containing 210 μm glass beads spacers. One hole was left in the glue to allow the vacuum backfilling of the cell with the electrolyte. The substrates having the same dimensions, they were slightly offset to provide for a place to anchor the electrical leads. The epoxy was thermally cured at 120° C. for 1 hour under normal atmosphere. The cell was vacuum backfilled with an electrolyte consisting of 13.5 g propylene carbonate, 18.9 g of tetramethylene sulfone, 0.23 g of ferrocene, 0.03 g of lithium perchlorate, 0.09 g of lithium tetrafluoroborate, 1.64 g of Uvinul 400, and 0.70 g of pyridine. The filing hole was plugged with a UV curable glue (Sarbox 500 containing 4% (w/w) Irgacure 184) and the dark blue cell was placed in an oven at 100° C. for 4 hours. When 0.6V was applied to the PANI coated electrode, the transmittance (photopic filter) of the blue cell changed from 19% T to 71% T at 550 nm. When 0.0V was applied, the reflectivity went back to 19% T.

EXAMPLE 15

WO₃ and Cobaltocene

A 3>3 in. piece of TEC20 glass substrate was coated with a thin film of WO₃ by a sol-gel method such as disclosed by U.S. Pat. No. 5,252,354 and U.S. Pat. No. 4,277,986, the disclosure of both of which is incorporated by reference herein as if fully set forth. A cell was assembled by sealing these two substrates at the edges with an epoxy glue containing 210 μm glass bead spacers. One hole was left in the epoxy glue to allow the filling of the cell. The substrates having the same dimensions, were slightly offset to provide for a place to anchor the electrical leads. This assembly process was carried out under normal atmospheric conditions and the epoxy was thermally cured in an oven under normal atmosphere as well. The cell was then vacuum back filled with an electrolyte consisting of a propylene carbonate (PC):Sulfolane (TS) mixture (60:40) containing 0.03M cobaltocene, 0.01M LiClO₄, and 0.04M LiBF₄. The device immediately colored after filling. The filling hole was plugged with an epoxy glue. When a potential of +1.3 V was applied to the device (the positive lead being connected to the WO₃ coated electrode), its transmittance (measured at 550 nm) changed from 5% T to 55% T in about 190 seconds. The leakage current in the bleached state was 9 mA for an area of 45.5 cm². When the power source was disconnected, its transmission went back from 55% T to 5% T in about 100 second.

Other variations and modifications of this invention will be obvious to those skilled in the art.

We claim:

1. An electrochromic device comprising a conducting electrode opposing a counter conducting electrode with an electrochemically active polymeric material layer disposed on an opposing surface of one of said electrodes and a nonaqueous electrolyte containing at least one electrochromically reversible redox active material contactingly disposed between said electrochemically active polymeric material layer and an other opposing surface of one of said electrodes, wherein at least one of said electrodes is transparent.

2. The electrochromic device according to claim 1, further comprising a first substrate disposed on an outwardly facing surface of one of said electrodes and a second substrate disposed on an other outwardly facing surface of said electrodes, wherein at least one of said substrates is transparent.

3. The electrochromic device according to claim 1, wherein said electrolyte contains at least one ionic material.

4. The electrochromic device according to claim 1, wherein the electrolyte contains a mixture of salts having different cations or anions.

5. The electrochromic device according to claim 1, wherein the redox active material is a viologen salt.

6. The electrochromic device according to claim 1, wherein the electrochemically active polymeric layer contains an additive selected from group consisting of UV stabilizers, adhesion promoting agents, heat stabilizers and mixtures thereof.

7. The electrochromic device according to claim 1, wherein the electrolyte contains an additive selected from group consisting of UV stabilizers, heat stabilizers and mixtures thereof.

8. The electrochromic device according to claim 1, wherein the electrolyte is comprised of a mixture of at least two solvents.

9. The electrochromic device according to claim 1, wherein the electrolyte contains a passive visible or infrared dye.

10. The electrochromic device according to claim 1, wherein the electrolyte is comprised of an inert polymeric additive.

11. The electrochromic device according to claim 1, wherein the electrolyte is comprised of a solid polymeric material.

12. The electrochromic device according to claim 1, wherein the electrolyte is comprised of at least one monomer which is polymerizable to a solid after exposure to heat or radiation.

13. The electrochromic device according to claim 1, wherein the electrochemically active polymeric layer is electrochromic.

14. The electrochromic device according to claim 1, wherein the electrochemically active polymeric layer is selected from the group consisting of a copolymer, a blend and a composite, wherein said copolymer, said blend or said composite contains at least one electrochemically active compound.

15. The electrochromic device according to claim 1, wherein the electrochemically active polymeric layer is electronically conductive in at least its oxidized or reduced state.

16. The electrochromic device according to claim 1, wherein the electrochemically active polymeric layer is selected from the group consisting of polyaniline, a polyaniline derivative and mixtures thereof.

17. The electrochromic device according to claim 1, wherein the at least one transparent electrode is comprised of a group selected from doped indium oxide, doped tin oxide and doped zinc oxide.

18. The electrochromic device according to claim 2, wherein the at least one transparent substrate is selected from group of specific colored substrates, photochromic substrates, infrared absorbing substrates, reflecting substrates, ultraviolet absorbing substrates and mixtures thereof.

19. The electrochromic device according to claim 2, wherein the at least one transparent substrate is further comprised of a coating on the outward facing surface, said coating selected from the group consisting of an antireflection coating, an antifogging coating, an antiabrasion coating, an ultraviolet quenching coating and mixtures thereof.

20. The electrochromic device according to claim 2, wherein at least one of the substrates is further comprised of a coating, tape or lamination selected from the group consisting of an antilacerative, an antiscatter, a colored, a ultraviolet blocking, an IR blocking coating, tape or lamination and mixtures thereof.

21. The electrochromic device according to claim 2, wherein one of said substrates is reflective.

22. The electrochromic device according to claim 2, further comprising a reflective layer disposed on an inward or outward facing surface of one of said substrates.

23. The electrochromic device according to claim 1, wherein one of said electrodes is a reflective material.

24. The electrochromic device according to claim 2, wherein said device is a vehicular mirror or a vehicular glazing.

25. The electrochromic device according to claim 24, wherein said vehicular mirror is an interior vehicular mirror or an exterior vehicular mirror.

26. The electrochromic device according to claim 25, wherein said interior vehicular mirror is a rearview mirror.

27. The electrochromic device according to claim 24, wherein said vehicular glazing is selected from the group consisting of a vehicular window, a sun roof, sunvisor and a shadeband.

28. An electrochromic device comprising a conducting electrode opposing a counter conducting electrode with an electrochemically active polymeric layer of a polyaniline or a polyaniline derivative disposed on an opposing surface of one of said electrodes and an electrolyte containing a viologen salt disposed in a contacting relationship between said electrochemically active layer and an other opposing surface of one of said electrodes, wherein at least one of said electrodes is transparent.

29. The electrochromic device according to claim 28, further comprising a first substrate disposed on an outwardly facing surface of one of said electrodes and a second substrate disposed on an other outwardly facing surface of said electrodes, wherein at least one of said substrates is transparent.

30. The electrochromic device according to claim 29, wherein one of said substrates is reflective.

31. The electrochromic device according to claim 29, further comprising a reflective layer disposed on an inward or outward facing surface of one of said substrates.

32. The electrochromic device according to claim 28, wherein one of said electrodes is reflective.

33. The electrochromic device according to claim 28, wherein the electrolyte contains at least one UV stabilizer/absorber.

34. An electrochromic device comprising a conducting electrode opposing a counter conducting electrode with an electrochemically active polymeric material layer disposed on an opposing surface of one of said electrodes and a nonaqueous electrolyte containing at least one electrochromically reversible redox active material contactingly disposed between said electrochemically active polymeric material layer and an other opposing surface of one of said electrodes, wherein at least one of said electrodes is transparent and (i) said electrochemically active polymeric material is a negative electrochemically active polymeric material having a redox potential greater than a redox potential of said redox active material or (ii) said electrochemically active polymeric material is a positive electrochemically active polymeric material having a redox potential less than a redox potential of said redox active material.

35. An electrochromic device according to claim 34, further comprising a first substrate disposed on an outwardly facing surface of one of said electrodes and a second substrate disposed on an other outwardly facing surface of said electrodes, wherein at least one of said substrates is transparent.

36. An electrochromic device according to claim 35, wherein said electrochemically active polymeric material is selected from the group consisting of polyaniline, a polyaniline derivative and mixtures thereof.

37. An electrochromic device according to claim 36, wherein the redox active material is a metallocene or its derivative.

38. An electrochromic device according to claim 37, wherein the metallocene is ferrocene.

39. An electrochromic device comprising a conducting electrode opposing a counter conducting electrode with an electrochemically active inorganic metal oxide material layer disposed on an opposing surface of one of said electrodes and a nonaqueous electrolyte containing at least one electrochromically reversible redox active material contactingly disposed between said electrochemically active inorganic metal oxide material layer and an other opposing surface of one of said electrodes, wherein at least one of said electrodes is transparent and (i) said electrochemically active inorganic metal oxide material is a negative electrochemically active inorganic metal oxide material having a redox potential greater than a redox potential of said redox active material or (ii) said electrochemically active inorganic metal oxide material is a positive electrochemically active inorganic metal oxide material having a redox potential less than a redox potential of said redox active material.

40. An electrochromic device according to claim 39, further comprising a first substrate disposed on an outwardly facing surface of one of said electrodes and a second substrate disposed on an other outwardly facing surface of said electrodes, wherein at least one of said substrates is transparent.

41. An electrochromic device according to claim 40, wherein said inorganic metal oxide is selected from the group consisting of $WO_3$, $V_2O_5$, $MoO_3$, $Nb_2O_5$, $TiO_2$, $CuO$, $Ni_2O_3$, $Ir_2O_3$, $Cr_2O_3$, $Co_2O_3$, $Mn_2O_3$ and mixtures thereof.

42. An electrochromic device according to claim 41, wherein said redox active material is a metallocene or its derivative.

43. An electrochromic device according to claim 42, wherein said metallocene is cobaltocene.

* * * * *

UNITED STATES PATENT AND TRADEMARK OFFICE
CERTIFICATE OF CORRECTION

PATENT NO. : 5,729,379

DATED : March 17, 1998

INVENTOR(S): PIERRE-MARC ALLEMAND ET AL.    Page 1 of 4

It is certified that error appears in the above-identified patent and that said Letters Patent is hereby corrected as shown below:

TITLE PAGE

Item: [56] "Fitzpatrick, Cella, Harper Scinto" should read --Fitzpatrick, Cella, Harper & Scinto--.

COLUMN 1

Line 47, "which," should read --which--;

Line 57, "references," should read --references--;

COLUMN 3

Line 44, "poly(isothianaphtene)" should read --poly(isothianaphthene)--;

COLUMN 5

Line 52, "a" (second occurrence) should read --an--;

COLUMN 7

Line 1, "Tex.)" should read --Tex.),--;
    Line 59, "microns This" should read --microns. This--;

UNITED STATES PATENT AND TRADEMARK OFFICE
CERTIFICATE OF CORRECTION

PATENT NO. : 5,729,379

DATED : March 17, 1998

INVENTOR(S): PIERRE-MARC ALLEMAND ET AL.

It is certified that error appears in the above-identified patent and that said Letters Patent is hereby corrected as shown below:

COLUMN 8

Line 2, "double sided" should read --double-sided--;

COLUMN 9

Line 11, "affect" should read --effect--;

COLUMN 10

Line 40, "polyisothianapthene" should read --polyisothianaphthene--;

COLUMN 13

Line 51, "ooanisidine" should read --o-anisidine--;

COLUMN 15

Line 23, "such a" should read --such as--;
    Line 28, "specially" should read --especially--;
    Line 50, "deoxgynated" should read --deoxygenated--;

COLUMN 16

Line 20, "filing" fhould read --filling--;

UNITED STATES PATENT AND TRADEMARK OFFICE
CERTIFICATE OF CORRECTION

PATENT NO. : 5,729,379

DATED : March 17, 1998

INVENTOR(S): PIERRE-MARC ALLEMAND ET AL.

It is certified that error appears in the above-identified patent and that said Letters Patent is hereby corrected as shown below:

COLUMN 19

Line 55, "trillate" should read --triflate--;

COLUMN 20

Line 34, ".its" should read -- Its--;
    Line 53, "non conjugated" should read --non-conjugated--;

COLUMN 21

Line 11, "non conductive" should read --non-conductive--;
    Line 17, "back" should read --back---;
    Line 19, "(w/w)" should read --6% (w/w)--;
    Line 22, "seconds." should read --9 seconds.--;
    Line 55, "filing" should read --filling--;
    Line 66, "3>3 in." should read --3x3 in.--;

COLUMN 22

Line 10, "back" shoulc read --back---;
    Line 22, "second." should read --seconds.--

UNITED STATES PATENT AND TRADEMARK OFFICE
CERTIFICATE OF CORRECTION

PATENT NO. : 5,729,379

DATED : March 17, 1998

INVENTOR(S) : PIERRE-MARC ALLEMAND ET AL.   Page 4 of 4

It is certified that error appears in the above-identified patent and that said Letters Patent is hereby corrected as shown below:

```
    Line 52, "group" should read --the group--;
    Line 57, "group" should read --the group--;
```

COLUMN 23

```
    Line 31, "group" should read --the group--;
    Line 44, "a" (second occurence) should read --an--.
```

Signed and Sealed this

Third Day of August, 1999

Attest:

Q. TODD DICKINSON

*Attesting Officer*   *Acting Commissioner of Patents and Trademarks*